March 12, 1940. W. M. DETTWEILER 2,193,063
AUXILIARY SAFETY LIGHTING SYSTEM FOR VEHICLES
Filed Nov. 8, 1937 4 Sheets-Sheet 3
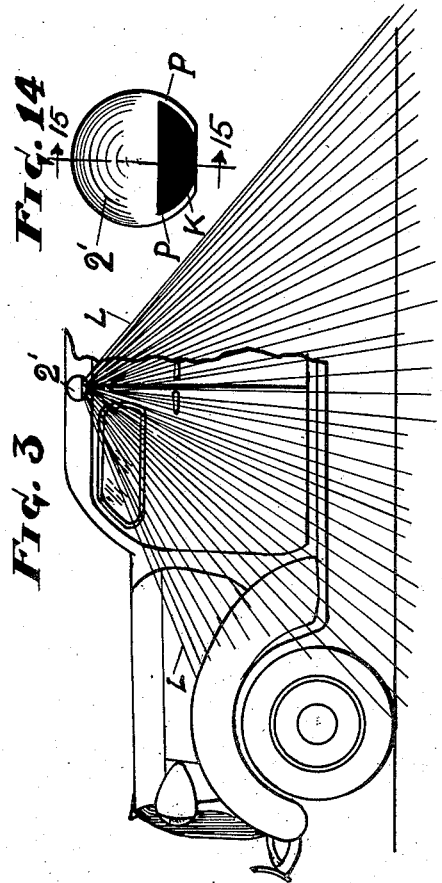
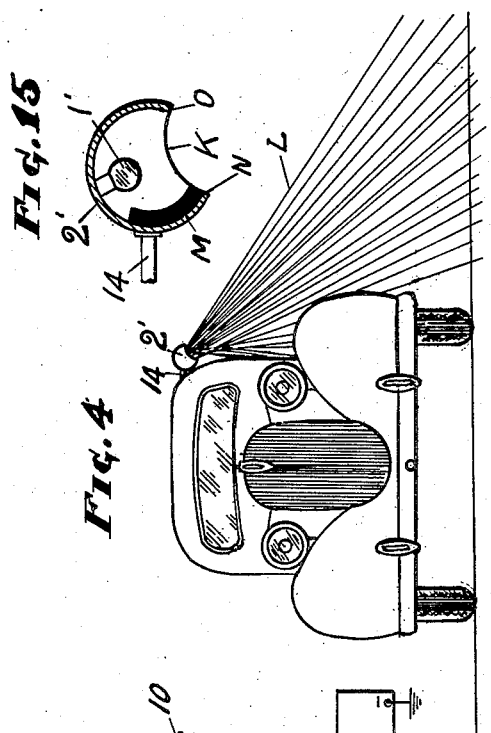
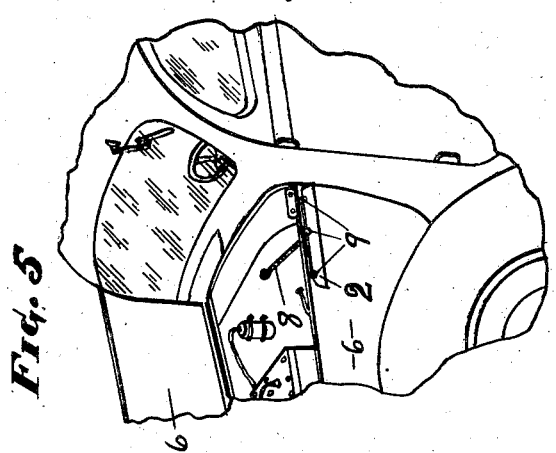
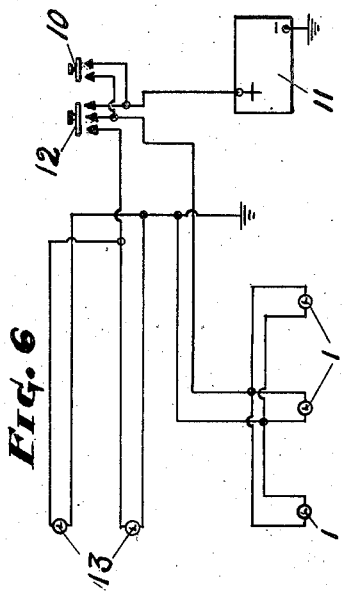
INVENTOR.
WALTER M. DETTWEILER
BY
U. S. Charles
ATTORNEY.

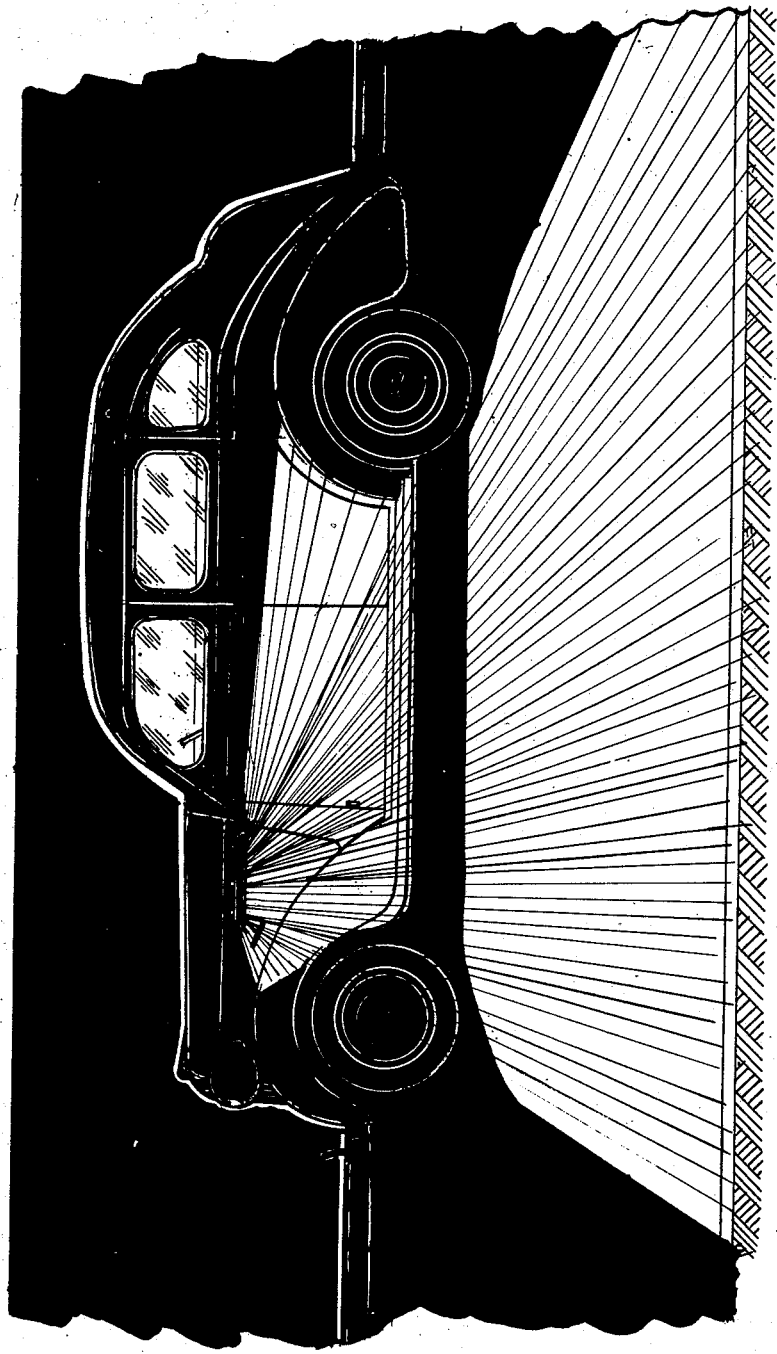

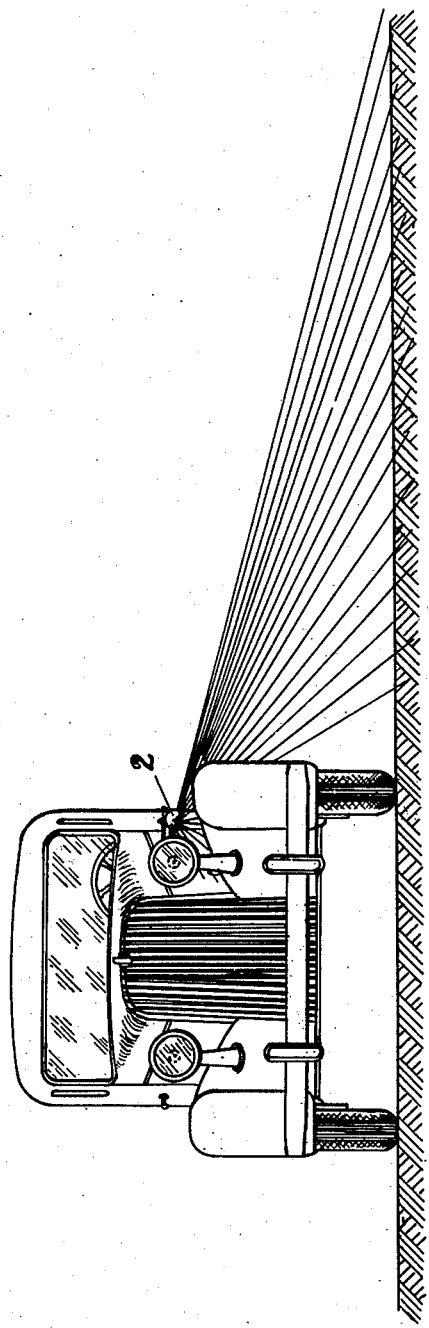

March 12, 1940. W. M. DETTWEILER 2,193,063
AUXILIARY SAFETY LIGHTING SYSTEM FOR VEHICLES
Filed Nov. 8, 1937 4 Sheets-Sheet 4
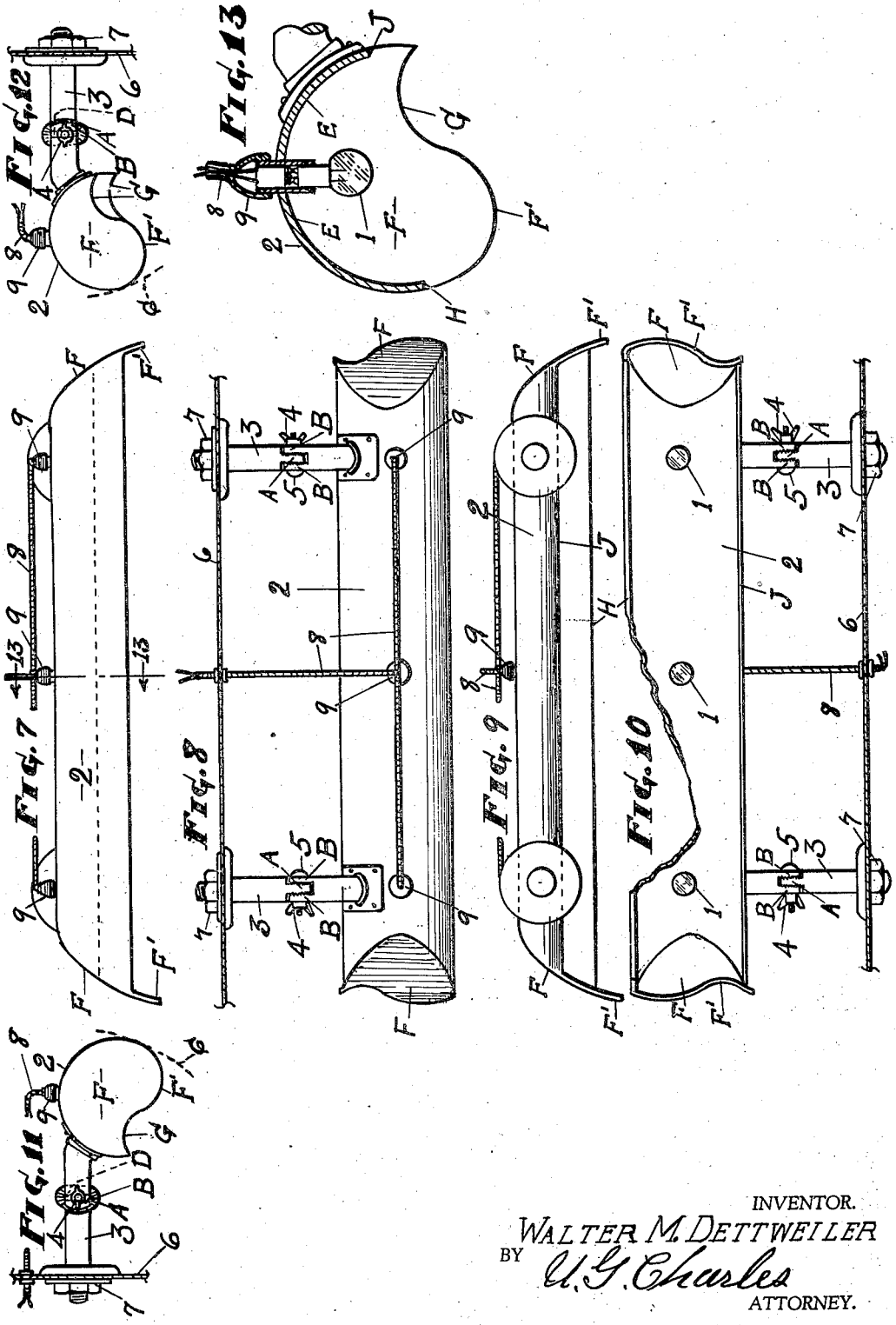
INVENTOR.
WALTER M. DETTWEILER
BY
U.G. Charles
ATTORNEY.

Patented Mar. 12, 1940

2,193,063

UNITED STATES PATENT OFFICE 2,193,063

AUXILIARY SAFETY LIGHTING SYSTEM FOR VEHICLES

Walter M. Dettweiler, Halstead, Kans.

Application November 8, 1937, Serial No. 173,398

2 Claims. (Cl. 240—8.2)

My invention relates to an auxiliary safety lighting system for vehicles, and has for its principal object a means to illuminate the side of a vehicle upon which it is installed and also the road adjacent the illuminated side of the vehicle.

A further object of my invention is to provide an illuminating element that is inexpensive to construct and install at a selected point on the body of a motor-driven vehicle, and means to control the lamp independently or in the circuit with a standard vehicle lighting system.

A still further object of my invention is to provide in the lamp fixture, means to conceal the direct lamp rays from drivers of approaching vehicles and also obscure direct rays from view of the occupants of the vehicle upon which the fixture is installed.

These and other objects will hereinafter be more fully explained, reference being had to the accompanying drawings forming a part of this specification, and in which like characters will apply to like parts in the different views.

Referring to the drawings:

Fig. 1 is a side view of an automobile equipped with the lighting fixture, showing a portion of one side of the vehicle and road adjacent thereto illuminated.

Fig. 2 is a front end view of Fig. 1, showing the light rays directed outward and downward, and also illustrating that the lamp of the fixture is concealed from view of the driver of an approaching vehicle.

Fig. 3 is a side view fragmentarily of the vehicle body showing the fixture modified in form and positioned near the upper extremity of the body.

Fig. 4 is a front view of Fig. 3.

Fig. 5 is an enlarged perspective view fragmentarily of the vehicle front, the hood being opened.

Fg. 6 is a wiring diagram.

Fig. 7 is an enlarged side view of the lamp housing.

Fig. 8 is a plan view of Fig. 7.

Fig. 9 is a side view opposite to that shown in Fig. 7.

Fig. 10 is an inverted plan view partially broken away.

Fig. 11 is a front end view of the lamp housing showing one method of connecting the same to the hood.

Fig. 12 is a rear end view, and also a portion of the front end to illustrate the difference in contour of the lower edges of each end.

Fig. 13 is an enlarged sectional view taken on line 13—13 in Fig. 7.

Fig. 14 is a side view of the fixture as modified for an upper position on the vehicle body.

Fig. 15 is a sectional view taken on line 15—15 in Fig. 14.

My invention herein disclosed consists of a light fixture positioned preferably on the side of a motor-driven vehicle to illuminate its respective side portion of the body and the road adjacent thereto, whether stationarily positioned or in transit. In either case proper illumination is provided for safe steering at the time of vehicles passing each other. Each vehicle will illuminate the road for the other, and likewise each vehicle will have its own body side illuminated so that the distance they are spaced from each other can be clearly ascertained. The said safety lighting arrangement will function with great efficiency even should one of the passing vehicles be without the arrangement, and furthermore it will be understood that the illuminating fixture is so arranged that its light rays will not obstruct the view of the approaching vehicle driver, but rather assist him by illuminating the road at the point of passing each other.

The result, above pointed out, is accomplished through the medium of lamps 1 that are energized by the lighting system of the vehicle. The said lamps are positioned within a housing 2, that is secured to the vehicle as selected with respect to locations. The connection consists of a jointed arm 3, one member of said arm having a tongue A engaging between jaws B of the other member, said jaws being tensioned upon the tongue by a wing nut 4, threadedly engaging on a bolt 5, by which means the housing may be rocked in a vertical direction as shown by dotted lines C in Figs. 11 and 12. The tongue of each arm, having an elongated slot D transversely crossing the axis of said arms, provides means by which the housing may be tilted a short distance longitudinally. Being so arranged, the light ray direction may be varied and when positioned as desired, the said wing nut and bolt arrangement is means for securing the housing as selectively rocked.

The said arms 3 are secured to the hood portion 6 by perforating the same to receive the arms insertible therethrough. Each arm is secured by threaded engagement of a nut 7 substantially as shown in Figs. 8, 10, 11 and 12.

The said housing 2 contains a plurality of lamps 1, each of which are connected to the wiring system by a cable 8 through the medium of laterals 9 extending therefrom to each lamp. The cable connection may be controlled separately or by the switch mechanism of the vehicle. In other words, a preferred wiring system is set forth in Fig. 6 in which is shown two methods of control. One of which is, by closing switch 10 the battery 11 will be connected to lamps 1 and by closing dimmer switch 12 the said lamps 1 are energized simultaneously with the dimmer circuit of the head lights 13. The action and position of the bright light circuit is not shown in the drawings.

Figs. 7 to 10 inclusive illustrate an elongated housing, the body of which is arcuate in form with respect to cross section as shown at E in Fig. 13, the inside surface of which is highly polished, functioning as a reflector. Each end of said body portion is partially closed by an arcuate head F, which heads are likewise polished on the interior thereof. The heads function as a shield to obviate direct axial view through the housing, by which means the lamps contained in said housing are obscured from view with respect to the said axis. Each of said heads extends downward a short distance, as shown at F', as reflecting means longitudinally along the body of the vehicle, and each of said heads has an arcuate depression inward as at G, and the said depression being so positioned terminates in close proximity to the terminating edge of housing 2 that is adjacent the hood portion 6 of the vehicle, and the said arcuate depressions vary with respect to inner curvature as illustrated in Fig. 12, the purpose of which is to permit a greater extension of light rays rearward and upward upon the body of the vehicle as shown in Fig. 1.

Referring again to the said elongated housing body, attention is directed to the fact that its respective terminating edge portions H and J are so positioned as to obscure from view the light rays from the driver of the vehicle and from a driver of an approaching vehicle while passing each other, and at the same time permitting the light rays to illuminate the body portion of the vehicle to which the fixture is attached and also direct the light rays to the road as shown in Figs. 1 and 2. Consequently the light being so controlled will clearly illuminate the road for an approaching vehicle, the driver of which will discern, by virtue of the illuminated body, the space required for safe passing.

In Figs. 3 and 4 is shown a modified form for the fixture housing and position thereof, the said housing being identified as 2' and being connected by an arm 14 to the body of the vehicle adjacent to its top portion as shown in said Figs. 3 and 4, while the lamp 1' is connected similar to that above described for lamp 1.

The last said lamp housing is approximately spherical in form and has an opening K through the shell thereof, said opening positioned downward so that the light rays will extend therethrough diverging as indicated by lines L, and by having the opening and position of the housing so arranged, the side portion of the vehicle body and road adjacent the vehicle is illuminated in a similar manner to that previously described for the function of the other housing. To avoid an upper and outward trend of the light rays from the last described housing, I have obliterated a section of the polished interior as at M, while its respective edge portion of the opening as at N, guards against light rays entering the glazed opening of the vehicle doors to avoid light confusing for the driver of the vehicle, and the oppositely positioned edge of the opening as at O will restrict the light rays upon the road as shown in Fig. 4, while the arcuate form as at P will restrict the rays longitudinally of the vehicle as shown in Fig. 3.

While I have shown and described lamp housings of specific forms, I do not wish to be restricted to such alone and the position on the vehicle may be varied, and furthermore, the said housings referred to as fixtures may be positioned on each of the front and rear fenders. In such case, the opening for light rays may be varied to provide a like result to that herein described, and the said safety illuminating system may be applied to other types of vehicles than that illustrated herein and such other modification may be made as lie within the scope of the appending claims.

Having fully described my invention, what I claim as new and desire to secure by Letters Patent is:

1. In an auxiliary safety lighting system for vehicles, an elongated housing semi-circular in cross section, there being a plurality of lamps within said housing and spaced therealong, a jointed arm connecting each end of the lamp housing to the hood of a vehicle body, one member of each arm being slotted to receive a bolt provided with a wing nut carried by the other member by which means the housing may be raised and lowered without rocking movement at the joint of said arms, a head to partially close the forwardly positioned end of the housing and a head to partially close the rearward end thereof, said heads arced outward and downward oppositely, the downward edge contour of each head comprised of reversed curvatures outward and inward, respectively, the outward extending curvature adapted to cut off light rays from the lamps axial with the housing rearward and forward of the vehicle, the inward curvature of the rear head being of greater depth than that of the inward curvature of the front head to permit the light rays extending a greater distance rearward on the vehicle body.

2. In an auxiliary safety lighting system for vehicles, an elongated housing semi-circular in cross section, there being a plurality of lamps within said housing and spaced therealong, a jointed arm connecting each end of the lamp housing to a vehicle body, the sections of the arms attached to the housing being rotatably and transversely adjustable by means of the jointed connections, relative to the fixed sections of the arms, and means to secure the joints when selectively rocked, a head to partially close the forwardly positioned end of the housing and a head to partially close the rearward end thereof, said heads arced outward and downward oppositely, the downward edge contour of each head comprised of reversed curvatures outward and inward, respectively, the outward extending curvature adapted to cut off light rays from the lamps axial with the housing rearward and forward of the vehicle, the inward curvature of the rear head being of greater depth than that of the inward curvature of the front head to permit the light rays extending a greater distance rearward on the vehicle body.

WALTER M. DETTWEILER.